Feb. 25, 1941.   J. Z. DENINSON   2,232,774
METHOD OF SCANNING OR PROJECTING MOTION PICTURES AND OTHER PICTURES
Filed Feb. 7, 1938   3 Sheets-Sheet 2

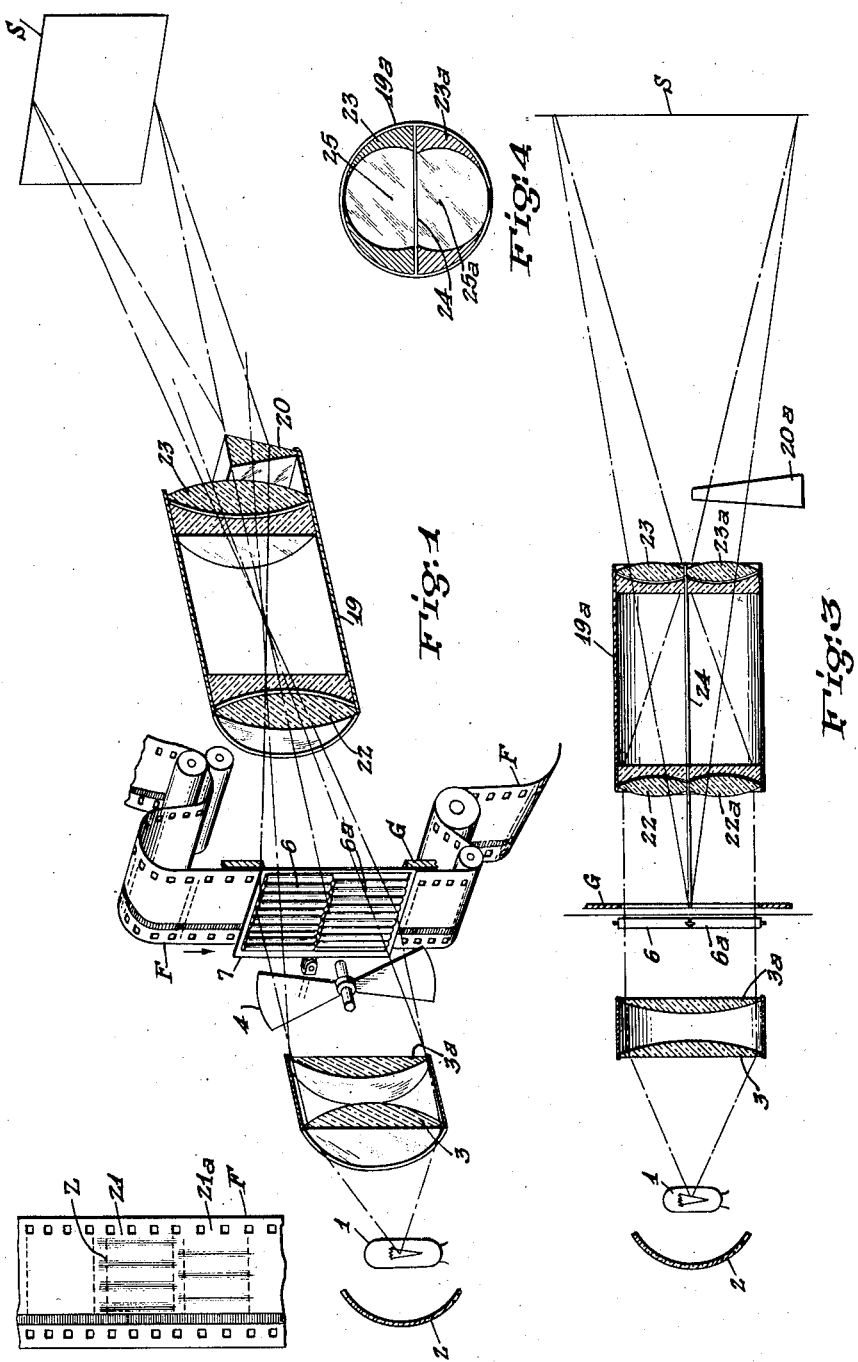

INVENTOR.
Jacob J. Deninson
BY Mock & Blum
ATTORNEYS

Feb. 25, 1941.   J. Z. DENINSON   2,232,774
METHOD OF SCANNING OR PROJECTING MOTION PICTURES AND OTHER PICTURES
Filed Feb. 7, 1938   3 Sheets-Sheet 3

INVENTOR.
BY Jacob Z. Deninson
ATTORNEYS

Patented Feb. 25, 1941

2,232,774

UNITED STATES PATENT OFFICE 2,232,774

METHOD OF SCANNING OR PROJECTING MOTION PICTURES AND OTHER PICTURES

Jacob Z. Deninson, New York, N. Y.

Application February 7, 1938, Serial No. 189,068

3 Claims. (Cl. 88—16.6)

My invention relates to new and improved scanning or projection of motion pictures and other pictures.

One of the objects of the invention is to provide an improved method whereby stereoscopic effects can be secured by projecting a single motion picture film of the conventional type. The invention is not limited to use in connection with motion pictures.

Another object of the invention is to provide simple mechanism for this purpose, which can be readily attached to a standard motion picture projector, at low cost.

Another object of the invention is to provide a method and mechanism whereby two consecutive frames of the motion picture film are simultaneously projected, in order to secure a stereoscopic effect.

Another object of the invention is to provide a method and an apparatus whereby selected vertical zones of two or more consecutive frames of the motion picture film are simultaneously projected so as to produce a single composite image on the screen, the selected zones being varied or shifted horizontally, while said frames are maintained stationary. Two or more pictures corresponding to a plurality of consecutive frames can be thus projected. The zones may be at any angle to the vertical direction.

Other objects of my invention will be set forth in the following description and drawings which illustrate a preferred embodiment thereof, it being understood that the above statement of the objects of my invention is intended generally to explain the same without limiting it in any manner.

Fig. 1 is a diagrammatic view showing one of the types of apparatus which may be used for carrying out the improved method.

Fig. 2 is an elevation of a pair of frames with the scanning zones indicated thereon.

Fig. 3 is a diagrammatic view illustrating another type of light-projection system.

Fig. 4 is an end elevation of the improved objective lens which is used in the system illustrated in Fig. 3.

Figures 9, 10:
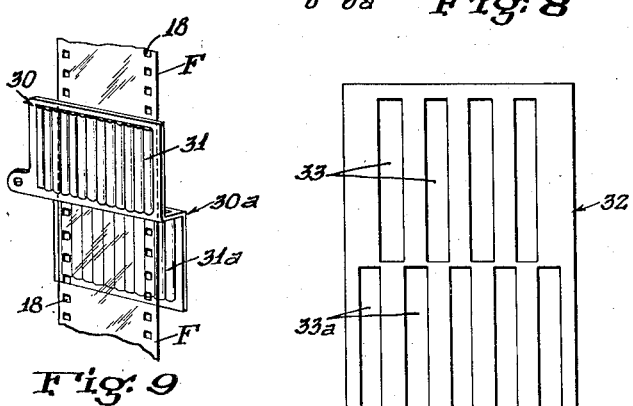
Fig. 9 illustrates a modification of the masking means of the cylinder type.
Fig. 10 is an elevation showing a modified type of scanning masking device.
Figure 7:
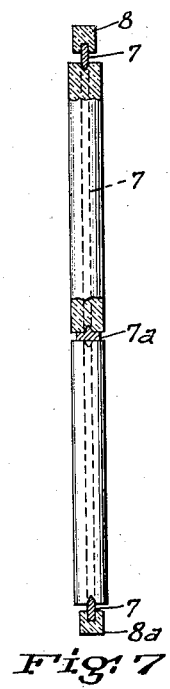
Fig. 7 is a sectional view on the line 7—7 of Fig. 6.
Figure 10C:
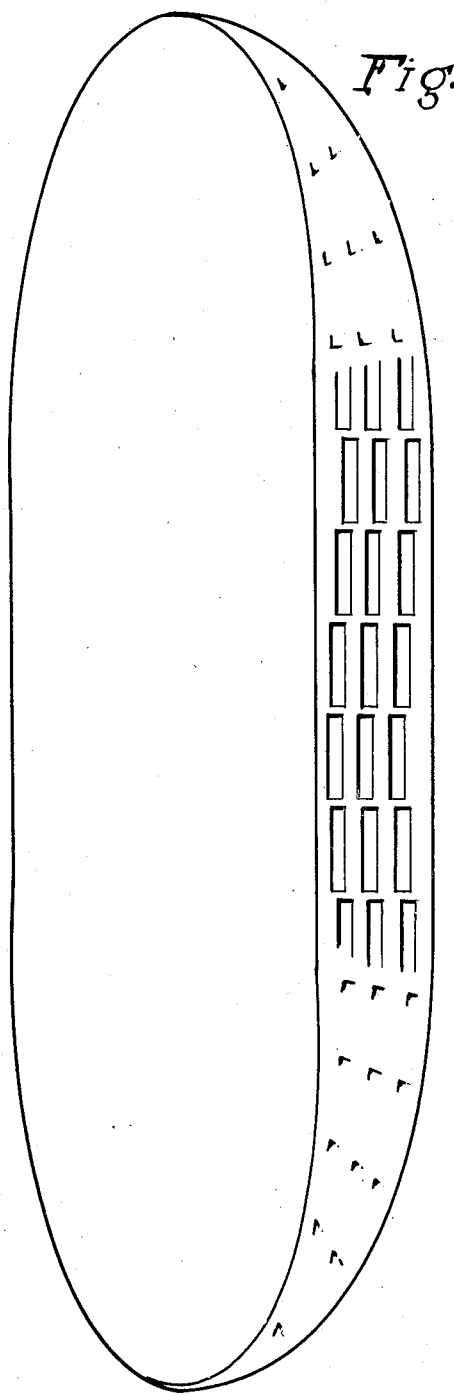
Figure 10A:
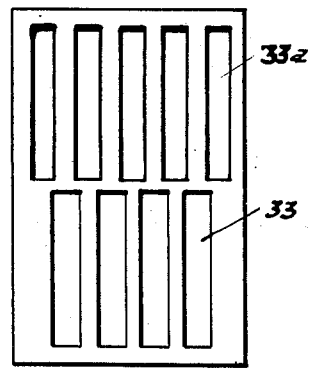
Figure 10B:
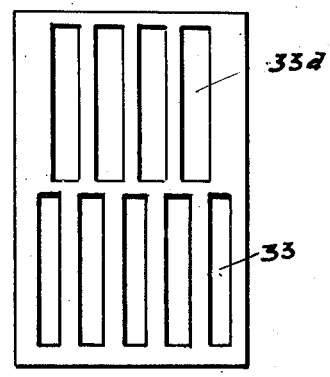

Figs. 10a, 10b and 10c show modifications of a scanning masking device of Fig. 10. In Fig. 10a the top group of slits is slightly wider than the bottom group of slits. In Fig. 10b the bottom group of slits is slightly wider than the top group of slits. Fig. 10c shows the device of Fig. 10 in the form of an endless band.

Figure 11:
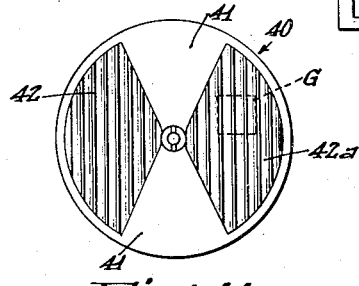

Fig. 11 shows a modified type of device, in which the scanning means or masking means are located in the apertures of the shutter of the projector.

For convenience, it is assumed that the film is run in a vertical direction through the gate of the projector although this is not essential to the invention.

Referring to Fig. 1, this shows a source of light 1 and a reflector 2. The light passes through conventional condenser lenses 3 and 3a. The film F is fed in the usual manner through the gate G. The gate G has been modified according to my invention so that a plurality of consecutive frames are located in the gate, during the periods in which the film remains stationary and said frames are projected.

While I have shown the simultaneous exposure of two consecutive frames, I do not wish to be limited to this, as the invention generally covers the projection of more than one frame, while the film is stationary. More than two frames, or one frame plus a part of the succeeding frame may be projected.

Fig. 1 also shows the conventional shutter 4 which has been modified so as to permit the simultaneous exposure of two frames.

Fig. 1 is in perspective so that the optical axis of the lenses is shown as being inclined. In practice this optical axis is horizontal.

In the embodiment shown in Fig. 1, suitable scanning means or masking means are located anterior the gate G, between the gate G and the shutter 4, or between the gate G and the condenser lenses.

Figure 6:
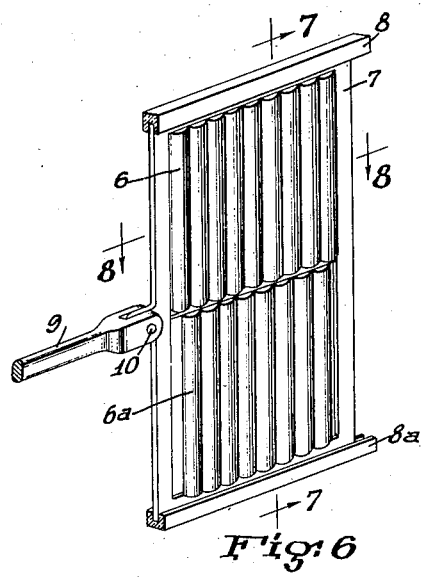
Fig. 6 is a perspective view showing the cylinder type of masking means or scanning means which are illustrated in Fig. 1 and Fig. 5.
Figure 8:
Fig. 8 is a sectional view on the line 8—8 of Fig. 6.

The cylinder type of scanning or masking means is shown in more detail in Fig. 6. Said masking means comprise a top row of cylinders 6 and a bottom row of cylinders 6a. The optical axes of said cylinders are vertical. Said cylinders 6 are identical in all respects and their optical axes are all located in the same vertical plane, said plane being perpendicular to the common optical axis of the condenser lenses and of the objective lenses which are shown in Fig. 1.

The cylinders abut each other in each row. The lower cylinders 6a are staggered relative to the upper cylinders 6. That is, the optical axis of each cylinder 6a is located midway between a pair of the optical axes of cylinders 6. These cylinders 6 and 6a are held in a suitable frame 7, which can be made of metal or any other suitable material. Said frame has a bar 7a intermediate the top and bottom edges of said frame. Said frame 7 is mounted slidably in guides 8 and 8a, so that the frame 7, together with cylinders 6 and 6a, can be reciprocated to and fro while the optical axes of the cylinders 6 and 6a remain vertical and in the aforesaid vertical plane. A single piece of glass can be ground into the shape of cylinder 6, or of cylinders 6a, or of both said rows of cylinders.

Figure 5:
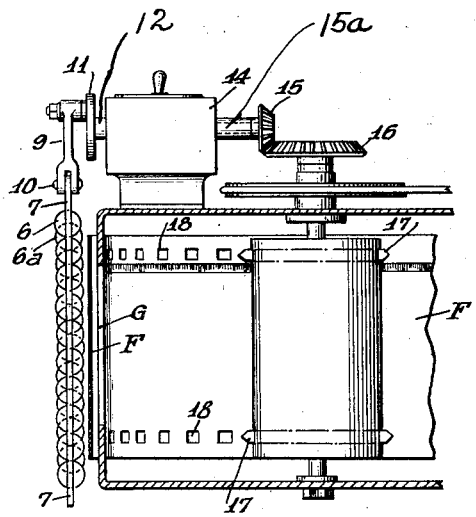
Fig. 5 illustrates the mechanism for laterally shifting the scanning means or masking means, which may be one or more rows of cylinders or other suitable masking means.

A link 9 is pivotally connected by pivot pin 10 to the frame 7. As shown in Fig. 5, the link 9 is connected eccentrically to a disc 11, which is mounted upon a shaft 12.

The shaft 12 projects from a wall of a speed-change box 14, which has suitable speed-change gearing. Said gearing is connected to shaft 15a, on which bevel gear 15 is mounted. Said bevel gear 15 meshes with a bevel gear 16, which is mounted upon a shaft which has the conventional sprocket wheels 17, which drive the film F by means of the conventional sprocket holes 18. The gears 15 and 16 and box 14 diagrammatically illustrate conventional means for causing the reciprocation of the frame 7 while it is maintained in the vertical position.

The period of reciprocation of the frame 7 may be varied at will, but it is ordinarily preferred to have the period of reciprocation shorter than the period of projection of the frames in gate G, and as short as possible.

For example, if the period of exposure of the frames in the gate G is one twenty-fourth ($\frac{1}{24}$) of a second, the frame 7 may be reciprocated eight times or more during this period of one twenty-fourth ($\frac{1}{24}$) of a second. Of course the frames are kept stationary in the gate G during this period of one twenty-fourth ($\frac{1}{24}$) of a second. Each of the stationary frames in the gate is thus scanned repeatedly during each period of projection. If reciprocating cylinders or the cylinders shown in Fig. 11, are used, the scanning operation is conducted back and forth.

The above example is merely illustrative and it is not intended to limit the invention in any manner. As later pointed out herein, each cylinder scans and permits the projection of a zone of the respective frame or picture, in each position of the cylinder.

The light then passes through the objective lenses 22 and 23, etc., which may be of the conventional type and which are located in a tube 19. A prism 20 is located in front of the tube 19 and the height of said prism is one-half the diameter of the objective lenses.

The prism 20 may be of any conventional shape in front elevation, as the object thereof is to superpose the image of the bottom frame upon the image of the top frame so that the composite image upon the screen S is of the same size as the image which is ordinarily secured by projecting a single frame. The prism 20 may be located in any suitable position relative to the objective lenses.

The cylinders 6 and 6a operate as scanning or masking devices, so as to cause the frames to be illuminated and to be scanned or projected along spaced vertical zones Z which are diagrammatically shown in Fig. 2.

Due to the staggered relative positions of the cylinders 6 and 6a, the scanned zones Z in the bottom frame 21a are staggered relative to the scanned zones in the top frame 21. It is assumed that the frames 21 and 21a are located in the gate G.

Due to the lateral shifting of the cylinders, the scanned zones of the frames 21 and 21a are also laterally shifted.

Hence, different portions of each frame are successively scanned or projected during the aforesaid period of projection, by means of the lateral shifting of the cylinders.

Since consecutive frames 21 and 21a show the same object or objects in slightly different positions, the effect is the same as though the observer rapidly shifted his position relative to the object, thus viewing the object from two different positions. This secures the stereoscopic effect.

In the modification shown in Fig. 3, the condenser lenses 3 and 3a are the same as in the previous embodiment, and the gate G also is large enough to permit the simultaneous projection of two frames.

In this embodiment, I have shown modified objective lenses 22, 22a, 23 and 23a. The negative lenses in the objective tube of Fig. 1 and of Fig. 3 have not been designated by reference numerals, because they are standard. The objective tube 19a is provided with a central longitudinal partition 24 which extends up to the vertical plane of the adjacent vertical wall of gate G.

As shown in Fig. 4, each of the objective lenses of Fig. 3 is equivalent to a single objective lens which has been cut diametrically.

In Fig. 4 the optical centers of the lenses 23 and 23a are indicated by the reference numerals 25 and 25a. The distances of said optical centers 25 and 25a from partition 24 is less than the distances of said optical centers from the inner wall of tube 19a. Said optical centers 25 and 25a are equidistant from partition 24.

As shown by the direction of the rays of light in Fig. 3, this construction of the lenses gives them a prismatic effect in addition to the usual action of an objective lens, so that the images of the two frames are superposed upon the same part of the screen.

In Fig. 3 I have shown a prism 20a in broken lines. The use of this prism is optional either to correct the paths of the light rays so as to produce two perfectly superposed images, or to supplement the prismatic effect of the modified objective lenses.

While I have shown a prism located between the objective lenses and the screen S, said prism could be used in any suitable part of the optical system, in order to cause the images of the two frames to be superposed on the screen S.

In the embodiment shown in Fig. 9, I have provided an angular frame 30 having a top row of cylinders 31 and a bottom row of cylinders 31a, and a flange 30a. The frame 30 may be made of two or more parts at flange 30a and said parts can be adjustably connected so as to regulate the horizontal distance between the cylinders 31 and the cylinders 31a.

In this embodiment, the cylinders 31 are in front of the film F and the cylinders 31a are behind the film F. This relation may be reversed.

The essential feature is that one row of cylinders is between the film and the condenser lenses and that the other row of cylinders is between the film and the objective lenses.

The arrangement of the cylinders shown in Fig. 9 minimizes any distortion which may be produced by the cylinders.

Fig. 10 shows a masking device 32 which is made of metal or any other suitable opaque material. This has slots 33 and 33a. The slots 33a are staggered relative to the slots 33. These slots 33 and 33a may be extremely narrow as their width has been very much exaggerated in Fig. 10. The width of a slot 33 may be a sixty-fourth of an inch, and less than or more than a sixty-fourth of an inch. The width of the slots 33 depends upon the character of the film, the type of illumination, and other factors so that this width may be varied as desired.

The scanning or masking unit illustrated in Fig. 10 may also be reciprocated between the film and the condenser lenses, or between the film and the objective lenses. It may be held stationary. The masking or scanning means of either type are preferably located as close as possible to the frame in the gate G.

The scanning or masking device shown in Fig. 10 may form part of an endless flexible band made of metal or other suitable material which is moved with suitable rapidity continuously in the same horizontal direction, so as to get the effect of scanning the frames in a series of separated vertical zones, these zones being rapidly shifted along a horizontal line.

By moving such band with sufficient speed, each frame is scanned repeatedly during each period of projection.

If the mask 32 is moved relative to the respective picture or frame, this movement should be sufficiently rapid to secure the effect of persistence of vision, as if the observer could see the entire picture.

If the device shown in Fig. 10 is reciprocated, the amplitude of reciprocation may be equal to, or greater than, the distance between adjacent slits 33 or adjacent slits 33a.

While I have described the movement of the scanning or masking means, the invention includes relative movement between the film and the masking means, no matter how said relative movement is produced.

The scanning means can be located in the aperture of the shutter, thus moving the scanning means relative to the film, by means of a turning movement relative to a center point.

For example, Fig. 11 shows a modified shutter 40 having opaque blades 41 and intermediate apertures 42 and 42a. The apertures 42 and 42a are provided with scanning means, either cylinders or means of the type shown in Fig. 10. The apertures 42 and 42a are much larger than the gate G.

Therefore, during the period of projection, the axes of the scanning members 42 and 42a will vary only slightly from the vertical position. The gate G is indicated in broken lines in Fig. 11.

During the period of exposure of the two frames in the gate G, the axes of the masking elements will move slightly from one side of the vertical position to the other side of the vertical position.

The frames which are simultaneously projected are either consecutive or close to each other, so that said frames may be designated as being in close time relation. In such frames the relative positions of the moving objects are not too far apart.

When identical cylinders are used in the device shown in Fig. 6, it is difficult to eliminate shadows on the projected picture. This is due to the fact that the cylinders act like prisms and transmit less light at their thin parts than at their thick parts. By causing a relative movement of sufficient rapidity between the cylinders and the frames or pictures which are being scanned or projected, said shadows become wholly or substantially unnoticeable.

Likewise, one row of cylinders could be made of greater diameter than the other row, so as to eliminate said shadows wholly or substantially. It would then be unnecessary to produce relative movement between the rows of cylinders and the film.

The slitted masking or scanning device of Fig. 10 can be made with great precision, so as to eliminate such shadows, thus making it unnecessary to produce relative movement between said masking device and the film.

The slits 33a can be made wider than slits 33, so that the edges of slits 33a are offset laterally, relative to the edges of slits 33. Likewise slits 33 can be made wider than slits 33a. This will eliminate said shadows. The difference of width between the slits in the respective rows, may be very slight, just enough to eliminate shadows wholly or substantially.

Slits 33 and 33a may be the transparent windows of an optical screen of the type used in making half-tone plates or the like, or said windows may be formed by etching or scratching lines on a pane of glass, so as to produce opaque zones, corresponding to the areas between the transparent zones.

In order to avoid being limited to the preferred details specified previously, the theory and principle of the invention, which includes many possible embodiments, may be stated as follows:

The consecutive frames of a motion picture show the same moving object or objects, in slightly different positions.

The invention is not limited to the simultaneous projection of consecutive frames, because frames which are spaced from each other will frequently show the same moving object or objects with only slight differences in different positions, for the purposes of stereoscopic projection. If two such frames are projected to form a composite picture, without the use of masking or scanning means, and with the usual distance of throw between the projector and the screen, according to commercial practice in a motion picture theatre, the details of the composite image will not be sharp.

According to the invention, the effect is the same as though I started with two frames or pictures which do not differ too much in the relative positions of the moving object or objects, and it may be assumed, for theoretical purposes, that said two pictures are located behind each other in the gate of a projector. Each said picture has zones which are not being projected. The projected zones of one picture are between the projected zones of the other picture, so that the projected zones of one picture fill up the areas corresponding to the non-projected zones of the other picture, wholly or substantially.

The composite projected image will then have enough clearness of detail, because each zone of the projected image corresponds to a zone of only one of the pictures.

Another advantage of using a gate which admits two or more frames, is that each frame is projected in association with one or more different frames, in said gate.

The shifting of the masking means produces in effect, a very large series of different composite pictures, in gradual transition, of each set of pictures which are being simultaneously projected.

The scanning means may be of many different patterns, as shown in my application Serial No. 138,767 filed April 24, 1937.

The projected zones of the respective pictures are located so that the composite image is continuous or substantially continuous. The designation "substantially continuous" is broad enough to cover a picture having shadows or interruptions, as long as the image is recognizable.

The effect of the lenses which are located anterior the film is to illuminate the film. The condenser lenses are usually larger than the frames, so that a converging beam of light is projected by the condenser lenses on the film. The effect of a cylinder is generally equivalent to the effect of a double prism. If the light passes through a cylinder before striking the film, the light is bent towards the optical axis of the cylinder, so that the zone of the film which is illuminated, is of less width than the rectangular projection of the cylinder on the film. The height of said illuminated zone is equal to the height of the cylinder.

Hence the invention is not limited to the use of cylindrical light-refracting elements. Whenever the use of cylindrical light-refracting elements is referred to in the claims, this includes all light-refracting or light-reflecting elements which have the same optical action, namely, to illuminate spaced zones of the frame more strongly than intermediate zones.

If the film is located anterior some of the cylinders, as shown in Fig. 9, an image of the corresponding frame is produced, in which said image has zones of relatively strong illumination, and intermediate zones of weaker illumination, but the contrast will not be as strong as when the cylinders are located in front of the film, as shown in the upper part of Fig. 9.

Referring to Fig. 9, the cylinders 31, which are between the film and the light source, do not magnify the zones, if said cylinders are very close to the film, and the distance of the source of light from said cylinders 31 is much greater than the distance between cylinders 31 and the film.

Cylinders 31a have some magnifying effect if they are stationary, but such magnifying effect disappears wholly or substantially, when said cylinders are rapidly reciprocated or moved in a direction which is lateral to the line of projection on the screen.

In the composite projected image, the same objects are shown in slightly different time relation, in successive sections thereof. For example, it can be assumed that one frame shows a mouth in closed position, and that the other frame which is being projected, shows the lips slightly separated, due to said close time relation.

For convenience, assume that the mouth is horizontal. It can be assumed that the section of the image of the mouth at the left-hand end thereof, corresponds to the frame in which the mouth is closed. The next section of the projected image corresponds to a zone of the frame in which the lips are slightly separated. Successive small sections of the projected image will alternately show the lips contacting and in slightly spaced relation. The effect is the same as though said sections were alternately viewed by the observer while his eye was shifted back and forth relative to the mouth.

In addition, and by rapidly shifting the scanning means during the projection, each section of the mouth will appear alternately open and closed. If this is done while projecting the frames which represent the movement of the mouth from a closed position to a fully open position, the stereoscopic effect is secured.

If the pictures in the projected frames are in very close time relation, which is preferred, as said pictures may be taken at intervals of 1/24 of a second, or even less, the differences in relative position of the objects is very slight. It is therefore preferable to scan separated zones of each picture, and to shift said zones, while forming and projecting the composite picture.

It is preferable to use prisms or cylinders, or other means for refracting or reflecting light, in order to scan separated zones, instead of using an opaque mask having narrow slits. Such slits may cause colored diffraction fringes. This is eliminated by the use of suitable refracting or reflecting means, while scanning very narrow zones.

The scanning means may be shifted relative to the exposed film by any means, which may be actuated by any part of the projector, or by mechanism independent of the projector.

I claim:

1. A method of securing stereoscopic projection with a single film having a single row of longitudinally successive and equal frames which have aligned edges and which show objects in different relative positions, which consists in intermittently moving said film through a gate parallel to said aligned edges and holding a plurality of said successive frames stationary in a gate during a predetermined period of projection, simultaneously scanning spaced zones of the respective frames which are located in said gate during said period, the scanned zones of one frame being located intermediate the scanned zones of the next adjacent frame so that the distance of each scanned zone from an edge of its frame is respectively less than and greater than the distances of the next adjacent zones of the next adjacent frame from the corresponding edge of said frame, the zones which are thus simultaneously scanned being in substantial succession between the edges of the frames, the height of a scanned zone being equal to the height of a frame, optically projecting and combining said scanned zones of the respective frame to produce a single continuous composite projected picture in which the projections of said zones are in continuous succession and in groups, each of said groups consisting of projected adjacent zones of the respective frames, and shifting the scanned zones in a predetermined path a plurality of times during each period of projection, so that all of each frame is projected in the form of spaced zones a plurality of times during each period of projection.

2. A method according to claim 1 in which the zones are scanned by cylinders whose axes are parallel to the edges of the frames, said cylinders being moved in a direction substantially perpendicular to their axes during each projection period.

3. A method according to claim 1 in which the zones are scanned by cylinders whose axes are parallel to the edges of the frames, said cylinders being moved in a direction substantially perpendicular to their axes during each projection period, said cylinders being thus moved with sufficient rapidity to substantially eliminate shadows.

JACOB Z. DENINSON.